United States Patent
Cantrell

(10) Patent No.: US 9,557,170 B2
(45) Date of Patent: *Jan. 31, 2017

(54) SYSTEM AND METHOD OF DETERMINING THE ANGULAR POSITION OF A ROTATING ROLL

(71) Applicant: Stowe Woodward Licensco, LLC, Raleigh, NC (US)

(72) Inventor: Clifford Bruce Cantrell, White Post, VA (US)

(73) Assignee: Stowe Woodward Licensco, LLC, Raleigh, NC (US)

( * ) Notice: Subject to any disclaimer, the term of this patent is extended or adjusted under 35 U.S.C. 154(b) by 969 days.

This patent is subject to a terminal disclaimer.

(21) Appl. No.: 13/742,879

(22) Filed: Jan. 16, 2013

(65) Prior Publication Data

US 2013/0185015 A1    Jul. 18, 2013

Related U.S. Application Data

(60) Provisional application No. 61/587,361, filed on Jan. 17, 2012.

(51) Int. Cl.
*G01P 15/00* (2006.01)
*G01B 21/22* (2006.01)
(Continued)

(52) U.S. Cl.
CPC .............. *G01B 21/22* (2013.01); *D21F 3/06* (2013.01); *D21G 9/0036* (2013.01);
(Continued)

(58) Field of Classification Search
CPC ....... G01B 21/22; G06F 17/00; D21G 9/0036; D21G 9/0045; D21F 3/06; G01D 5/02; G01P 15/00
(Continued)

(56) References Cited

U.S. PATENT DOCUMENTS 2,815,907 A    12/1957  McCormick
3,308,476 A     3/1967  Kleesattel
(Continued)

FOREIGN PATENT DOCUMENTS

DE       863133       1/1953
DE     19920133      11/2000
(Continued)

OTHER PUBLICATIONS

Bazergui et al., *Embedded Strain Gages for the Measurement of Strains in Rolling Contact*; Experimental Mechanics, Oct. 1968, pp. 433-441.
(Continued)

*Primary Examiner* — John Breene
*Assistant Examiner* — Stephanie Bloss
(74) *Attorney, Agent, or Firm* — Myers Bigel, P.A.

(57) ABSTRACT

A method of determining the angular position of a roll includes: (a) detecting signals generated by an accelerometer attached to an end of a rotating roll; (b) determining whether a signal generated in step (a) has reached a pre-trigger threshold, and repeating step (a) if the signal has not reached the pre-trigger threshold; (c) if the signal is determined in step (b) to have reached the pre-trigger threshold, detecting a subsequent signal generated by the accelerometer; (d) determining whether the signal detected in step (c) has reached a trigger threshold, and repeating step (c) if the signal has not reached the trigger threshold; and (e) if the signal has reached the trigger threshold, establishing the angular position of the roll based on the signal that has reached the trigger threshold.

17 Claims, 4 Drawing Sheets

(51) Int. Cl.
*G06F 17/00* (2006.01)
*D21F 3/06* (2006.01)
*D21G 9/00* (2006.01)
*G01D 5/02* (2006.01)

(52) U.S. Cl.
CPC ............. *D21G 9/0045* (2013.01); *G01D 5/02* (2013.01); *G06F 17/00* (2013.01); *G01P 15/00* (2013.01)

(58) Field of Classification Search
USPC ........................................................ 702/141
See application file for complete search history.

(56) References Cited

U.S. PATENT DOCUMENTS

| | | | |
|---|---|---|---|
| 3,562,883 | A | 2/1971 | Kobayashi et al. |
| 3,665,650 | A | 5/1972 | Przygocki et al. |
| 3,962,911 | A | 6/1976 | Grenlund |
| 4,016,756 | A | 4/1977 | Kunkle |
| 4,233,011 | A | 11/1980 | Bolender et al. |
| 4,262,251 | A | 4/1981 | Fujishiro et al. |
| 4,352,481 | A | 10/1982 | Forward |
| 4,356,447 | A | 10/1982 | Honig et al. |
| 4,366,025 | A | 12/1982 | Gordon, Jr. et al. |
| 4,445,349 | A | 5/1984 | Eibe |
| 4,498,383 | A | 2/1985 | Pav et al. |
| 4,509,237 | A | 4/1985 | Volz et al. |
| 4,553,427 | A | 11/1985 | Kuraoka et al. |
| 4,729,153 | A | 3/1988 | Pav et al. |
| 4,797,827 | A | 1/1989 | Cockerham |
| 4,871,908 | A | 10/1989 | Shuratovsky et al. |
| 4,898,012 | A | 2/1990 | Jones et al. |
| 4,903,517 | A | 2/1990 | Van Haag et al. |
| 4,910,985 | A | 3/1990 | Ballyns |
| 4,938,045 | A | 7/1990 | Rosenstock et al. |
| 5,048,353 | A | 9/1991 | Justus |
| 5,086,220 | A | 2/1992 | Berthold et al. |
| 5,165,271 | A | 11/1992 | Stepper et al. |
| 5,379,652 | A | 1/1995 | Allonen |
| 5,383,371 | A | 1/1995 | Laitinen |
| 5,466,343 | A | 11/1995 | Kankaanpaa |
| 5,562,027 | A | 10/1996 | Moore |
| 5,592,875 | A | 1/1997 | Moschel |
| 5,604,304 | A | 2/1997 | Kokubo et al. |
| 5,684,912 | A | 11/1997 | Slaney et al. |
| 5,699,729 | A | 12/1997 | Moschel |
| 5,739,626 | A | 4/1998 | Kojima et al. |
| 5,915,648 | A | 6/1999 | Madrzak et al. |
| 5,925,220 | A | 7/1999 | Hirsch et al. |
| 5,947,401 | A | 9/1999 | Niccum |
| 5,953,230 | A | 9/1999 | Moore |
| 6,276,203 | B1* | 8/2001 | Hulsing, II ............. F02G 1/044 73/504.03 |
| 6,284,103 | B1 | 9/2001 | Eng et al. |
| 6,341,522 | B1 | 1/2002 | Goss et al. |
| 6,354,013 | B1 | 3/2002 | Mucke et al. |
| 6,361,483 | B1 | 3/2002 | Kirchner |
| 6,441,904 | B1 | 8/2002 | Shakespeare |
| 6,617,764 | B2 | 9/2003 | Sebastian et al. |
| 6,644,273 | B1 | 11/2003 | Hagari et al. |
| 6,752,908 | B2 | 6/2004 | Gustafson et al. |
| 6,892,563 | B2 | 5/2005 | Gustafson et al. |
| 6,910,376 | B2 | 6/2005 | Maenpaa |
| 6,981,935 | B2 | 1/2006 | Gustafson |
| 6,988,398 | B2 | 1/2006 | Saloniemi et al. |
| 7,185,537 | B2 | 3/2007 | Muhs |
| 7,225,688 | B2 | 6/2007 | Moore et al. |
| 7,572,214 | B2 | 8/2009 | Gustafson |
| 8,236,141 | B2 | 8/2012 | Pak |
| 2005/0080587 | A1* | 4/2005 | Giustino ............... B60T 8/1725 702/127 |
| 2005/0261115 | A1 | 11/2005 | Moore et al. |
| 2006/0090574 | A1 | 5/2006 | Moore et al. |
| 2006/0207319 | A1 | 9/2006 | Krozer et al. |
| 2006/0241895 | A1 | 10/2006 | Falsett et al. |
| 2007/0111871 | A1 | 5/2007 | Butterfield et al. |
| 2007/0162239 | A1 | 7/2007 | Lang |
| 2010/0324856 | A1* | 12/2010 | Pak .......................... D21F 3/06 702/138 |
| 2011/0004437 | A1* | 1/2011 | Wooldridge ........... G01B 7/012 702/141 |
| 2011/0301003 | A1 | 12/2011 | Gustafson et al. |
| 2015/0057878 | A1* | 2/2015 | Friel ................... B60C 23/0416 701/34.4 |

FOREIGN PATENT DOCUMENTS

| | | |
|---|---|---|
| EP | 1719836 | 11/2006 |
| FR | 2769379 | 4/1999 |
| FR | 2879750 | 12/2004 |
| JP | H08-006704 | 1/1996 |
| JP | 2000193551 | 7/2000 |
| JP | 2007331860 | 12/2007 |
| WO | WO 96/34262 | 10/1996 |
| WO | WO 01/53787 | 7/2001 |

OTHER PUBLICATIONS

Keller; *Measurement of the Pressure-Time Profile in a Rolling Calender Nip*; 77$^{th}$ Annual Meeting of the Canadian Section of the Pulp and Paper Assn. 1991, pp. B89-B96.
Knowles et al., *Multiple microbending optical-fibre sensors for measurement of fuel quantity in aircraft fuel tanks*; Sensors and Actuators vol. 68. No. 1-3 (Jun. 15, 1998) pp. 320-323 XP004139852.
Koriseva et al, *Soft calendar nip: an interesting subject for research and measurement*, Paper and Timber, 73 (1991): 5 pp. 419-423.
McCollum, *Fiber optic microbend sensor for detection of dynamic fluid pressure at gear interfaces*; vol. 65, No. 3, (Mar. 1, 1994) pp. 724-729 XP000435198.
McNamee, *A Study of Rubber Covered Press Roll Nip Dynamics. Part 1*; The Journal of the Technical Association of the Pulp and Paper Industry, vol. 48, No. 12, Dec. 1965, pp. 673-679.
Merriman, *Transducers and Techniques of Contact Pressure Measurement*; The Society for Experimental Mechanics, Spring Conference, Jun. 1991, pp. 318-320.
Parish, *Measurements of pressure distribution between metal and rubber covered rollers*; British Journal of Applied Physics, vol. 9, Apr. 1959, pp. 158-161.
Spengos, *Experimental Investigation of Rolling Contact*; Journal of Applied Mechanics, Dec. 1965, pp. 859-864.
International Search Report for PCT Application No. PCT/US2001/002013, mail date May 22, 2001.
International Search Report for PCT Application No. PCT/US2003/018895, mail date Sep. 30, 2003.
International Search Report and Written Opinion for PCT Application No, PCT/US2005/016456 mailed on Sep. 5, 2005.
International Search Report and Written Opinion for corresponding PCT Application No. PCT/US2013/021745 mailed on Apr. 11, 2013.
Extended European Search Report for EP05027237, Aug. 29, 2006.
International Preliminary Report on Patentability for corresponding PCT Application No. PCT/US2013/021745, Date of mailing Jul. 31, 2014.

* cited by examiner

SYSTEM AND METHOD OF DETERMINING THE ANGULAR POSITION OF A ROTATING ROLL

RELATED APPLICATION

The present application claims priority from U.S. Provisional Patent Application No. 61/587,361, filed Jan. 17, 2012, the disclosure of which is hereby incorporated herein in its entirety.

FIELD OF THE INVENTION

The present invention relates generally to industrial rolls, and more particularly to industrial rolls with sensing systems.

BACKGROUND OF THE INVENTION

In a typical papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing and packaging.

Cylindrical rolls are typically utilized in different sections of a papermaking machine, such as the press section. Such rolls reside and operate in demanding environments in which they can be exposed to high dynamic loads and temperatures and aggressive or corrosive chemical agents. As an example, in a typical paper mill, rolls are used not only for transporting the fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

As the paper web is conveyed through a papermaking machine, it can be very important to understand the pressure profile experienced by the paper web. Variations in pressure can impact the amount of water drained from the web, which can affect the ultimate sheet moisture content, thickness, and other properties. The magnitude of pressure applied with a roll can, therefore, impact the quality of paper produced with the paper machine.

It is known to include pressure and/or temperature sensors in the cover of an industrial roll. For example, U.S. Pat. No. 5,699,729 to Moschel et al. describes a roll with a helically-disposed leads that includes a plurality of pressure sensors embedded in the polymeric cover of the roll. The sensors are helically disposed in order to provide pressure readings at different axial locations along the length of the roll. Typically the sensors are connected to two leads or an optical fiber which transmit sensor signals to a processor that processes the signals and provides pressure and position information.

Because multiple sensors are attached to the two common leads or fiber, the signals from different sensors travel along the same leads or fiber. Therefore, the processor should have some way to distinguish which sensor has produced a particular signal; otherwise, the processor does not recognize the axial position of the sensor providing the signal. One common technique is the use of a "trigger" signal that alerts the processor to each revolution of the roll. This technique, described in U.S. Pat. No. 5,699,729, supra, employs a trigger signal generator that provides a signal every time a particular position on the roll passes a particular location. However, this technique can be susceptible to false readings due to noise in the signal. As such, it may be desirable to provide a technique for employing a trigger signal that addresses the signal noise inaccuracy.

SUMMARY OF THE INVENTION

As a first aspect, embodiments of the invention are directed to a method of determining the angular position of a roll, comprising the steps of: (a) detecting signals generated by an accelerometer attached to an end of a rotating roll; (b) determining whether a signal generated in step (a) has reached a pre-trigger threshold, and repeating step (a) if the signal has not reached the pre-trigger threshold; (c) if the signal is determined in step (b) to have reached the pre-trigger threshold, detecting a subsequent signal generated by the accelerometer; (d) determining whether the signal detected in step (c) has reached a trigger threshold, and repeating step (c) if the signal has not reached the trigger threshold; and (e) if the signal has reached the trigger threshold, establishing the angular position of the roll based on the signal that has reached the trigger threshold. This method can ensure that a triggering signal correctly indicates the proper position of the roll rather than being the result of noise.

As a second aspect, embodiments of the invention are directed to an industrial roll assembly, comprising: a cylindrical roll having a plurality of sensors mounted thereto and an accelerometer mounted to an end thereof; and a controller operatively associated with the accelerometer. The controller is configured to: (a) detect signals generated by the accelerometer; (b) determine whether a signal generated in (a) has reached a pre-trigger threshold, and repeating (a) if the signal has not reached the pre-trigger threshold; (c) if the signal is determined in (b) to have reached the pre-trigger threshold, detect a subsequent signal generated by the accelerometer; (d) determine whether the signal detected in (c) has reached a trigger threshold, and repeating (c) if the signal has not reached the trigger threshold; and (e) if the signal has reached the trigger threshold, establish the angular position of the roll based on the signal that has reached the trigger threshold.

As a third aspect, embodiments of the invention are directed to a computer program product for determining the angular position of a roll, the computer program product comprising a computer readable storage medium having computer readable program code embodied therein, the computer readable program code configured to: (a) detect signals generated by the accelerometer; (b) determine whether a signal generated in (a) has reached a pre-trigger threshold, and repeat (a) if the signal has not reached the pre-trigger threshold; (c) if the signal is determined in (b) to have reached the pre-trigger threshold, detect a subsequent signal generated by the accelerometer; (d) determine whether the signal detected in (c) has reached a trigger threshold, and repeat (c) if the signal has not reached the trigger threshold; and (e) if the signal has reached the trigger threshold, establish the angular position of the roll based on the signal that has reached the trigger threshold.

DETAILED DESCRIPTION OF EMBODIMENTS OF THE INVENTION

Figure 1:
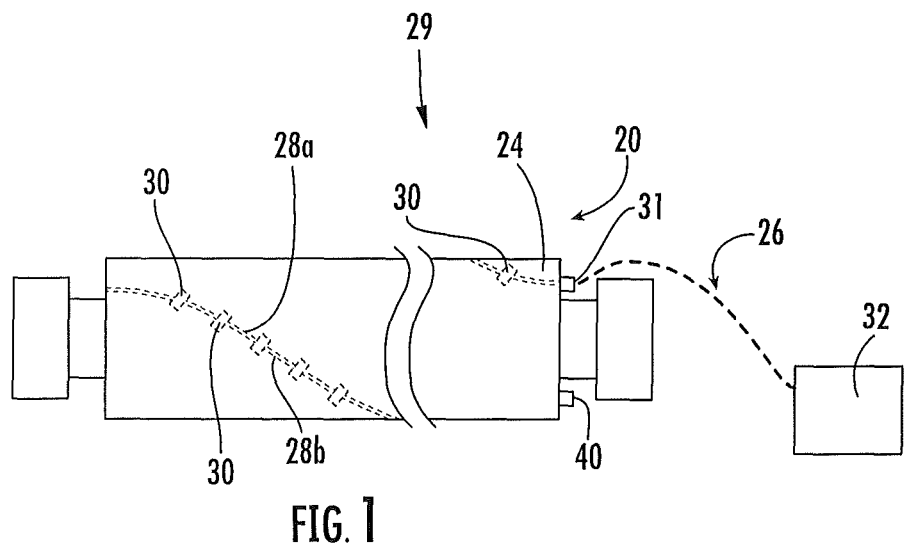
FIG. 1 is a front view of an industrial roll according to embodiments of the invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Well-known functions or constructions may not be described in detail for brevity and/or clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. As used herein, the term "and/or" includes any and all combinations of one or more of the associated listed items. Where used, the terms "attached," "connected," "interconnected," "contacting," "coupled," "mounted," "overlying" and the like can mean either direct or indirect attachment or contact between elements, unless stated otherwise.

Some embodiments may be embodied in hardware (including analog circuitry and/or digital circuitry) and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as a logic gate array and/or computer-readable program code executed by an instruction processing device(s) (e.g., general purpose microprocessor and/or digital signal processor), and/or analog circuitry. Although some of the diagrams include arrows on communication paths to show a primary direction of communication, it is to be understood that communication may occur in the opposite direction to the depicted arrows.

An industrial roll, such as a roll used in papermaking, is shown in FIG. 1 and is designated broadly therein at 20. The roll 20 includes a core (not shown) and a polymeric cover 24; the polymeric cover 24 typically includes a base layer and a topstock layer. Exemplary materials and construction of the core and cover 24 are described in U.S. Patent Publication No. 2007/0111871 and U.S. Patent Publication No. 2005/0261115, the disclosures of which are hereby incorporated herein, FIG. 1 also illustrates a sensing system 29 comprising a plurality of sensors 30 that are disposed along the length of the roll 20 in a single helical configuration. The sensors 30 are mounted on leads 28a, 28b, which are connected to a microprocessor/transmitter 31. Signals as sent from the microprocessor/transmitter 31 wirelessly (via wireless link 26) to a remote processor/display 32. Various exemplary configurations of the sensing system are described in detail in, for example, U.S. Pat. Nos. 5,562,027; 699,729; 6,981,935; 7,572,214; and 8,236,141, and U.S. Patent Publication Nos. 2005/0261115 and 2011/0301003, each of which is incorporated by reference herein.

When sensors, such as pressure or temperature sensors 30, are mounted onto a rotating roll such as the roll 20, it may become necessary to trigger data gathering or some other activity at a specific point in each rotation, i.e., at a particular angular position. The following describes a technique that can be used to trigger data gathering at the same point of rotation.

Figure 2:
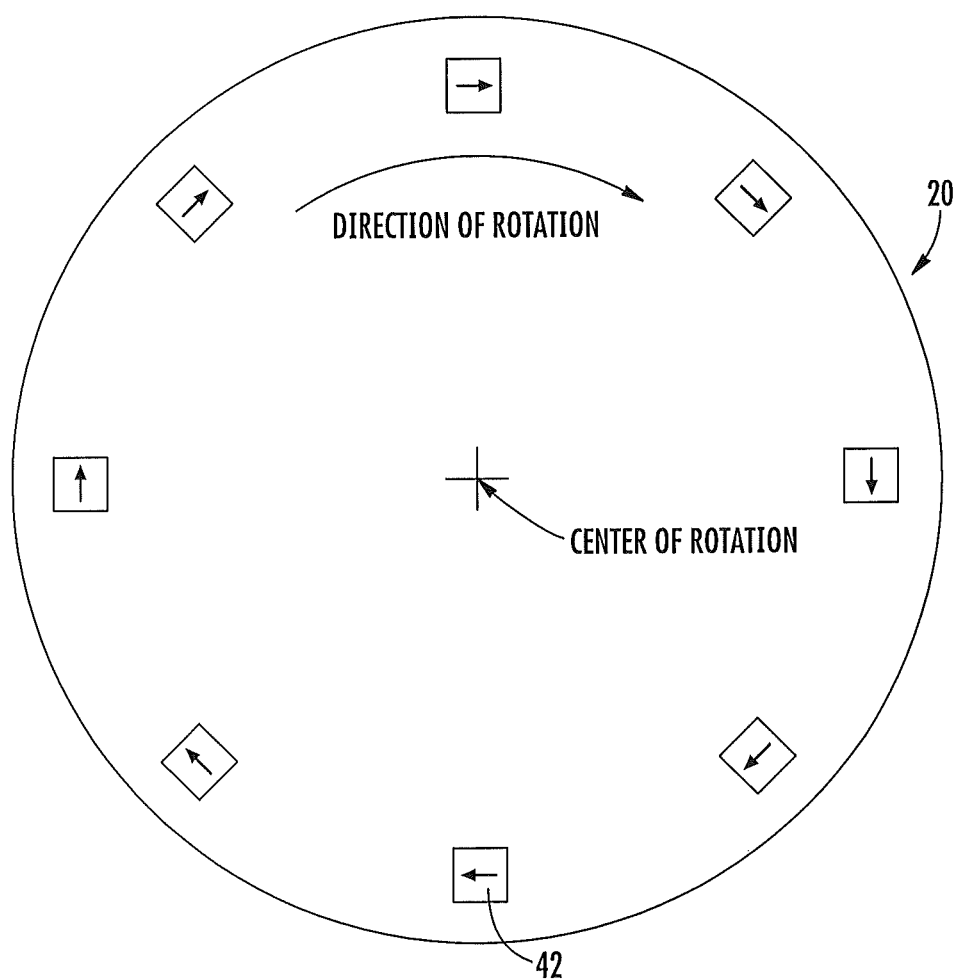
FIG. 2 is an enlarged end view of the roll of FIG. 1 showing an accelerometer and vectors created thereby during rotation of the roll.

The system comprises a device 40 (FIG. 1) that mounts on the end of the roll 20 and contains an accelerometer 42 of conventional construction that is mounted to detect acceleration in a direction perpendicular to the axis of the roll. As shown in FIG. 2, a typical mounting location is near the circumference of the roll 20. With the accelerometer 42 mounted tangentially to the roll 20, as the roll 20 turns an accelerometer vector caused by the acceleration of gravity rotates also. Referring to the roll 20 in FIG. 2, which is shown to rotate clockwise, when the accelerometer 42 is at the "3 o'clock" position the vector points down and has a magnitude of 1 G. When the accelerometer 42 is at the "6 o'clock" position (i. e., its lowest point), it reads a magnitude of zero since the gravity vector is orthogonal to the accelerometer vector. When the accelerometer 42 is at the "9 o'clock" position the accelerometer 42 reads −1 G, and at "12 o'clock" it reads zero (again, because the gravity vector is orthogonal to the accelerometer vector). Since the accelerometer 42 is mounted tangentially the centrifugal forces generated by the rotation are substantially constant and therefore are not a factor.

Figure 3:
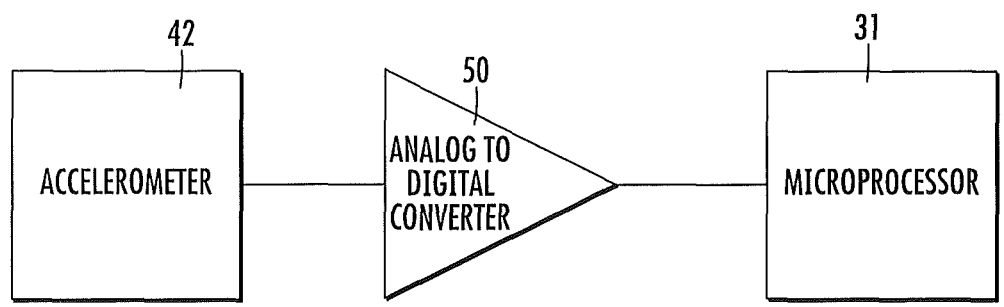
FIG. 3 is a schematic diagram of an electronics subassembly of the roll of FIG. 1.

FIG. 3 is an electronics diagram that illustrates an arrangement that can be used to monitor the accelerometer signal. An analog-to-digital converter 50 can be used to convert the signal transmitted by the accelerometer 50 from a voltage to a digital data stream, which is then fed to the microprocessor 31. Because the roll 20 is rotating about its axis, the accelerometer data follows the rotating gravity vector and, therefore, is generally sinusoidal in shape when plotted as a function of angular position. A graph of an exemplary theoretical sinusoidal function is shown in FIG. 4.

Figure 4:
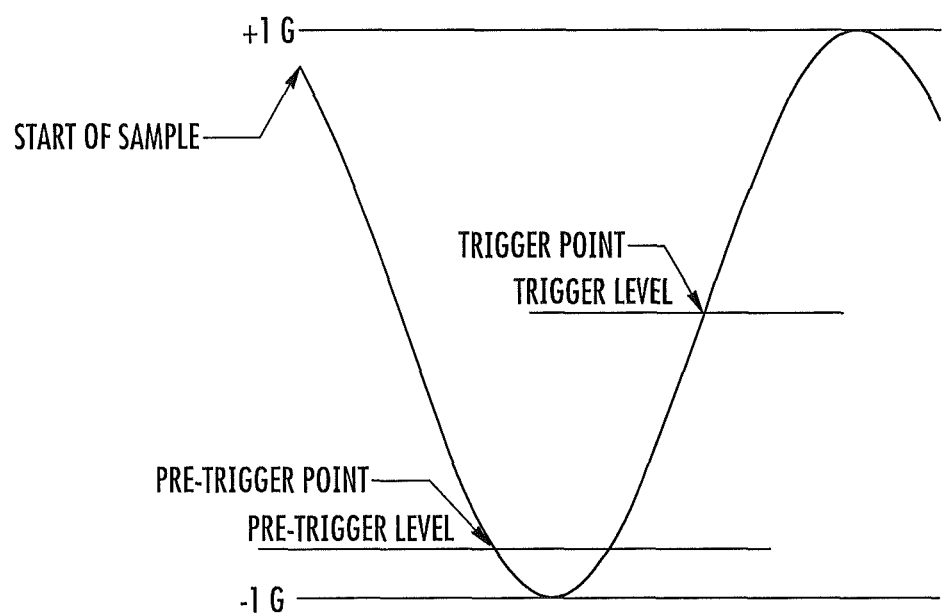
FIG. 4 is a graph plotting the accelerometer vector as a function of roll angle, which shows that the curve created by this plot is sinusoidal.
Figure 5:
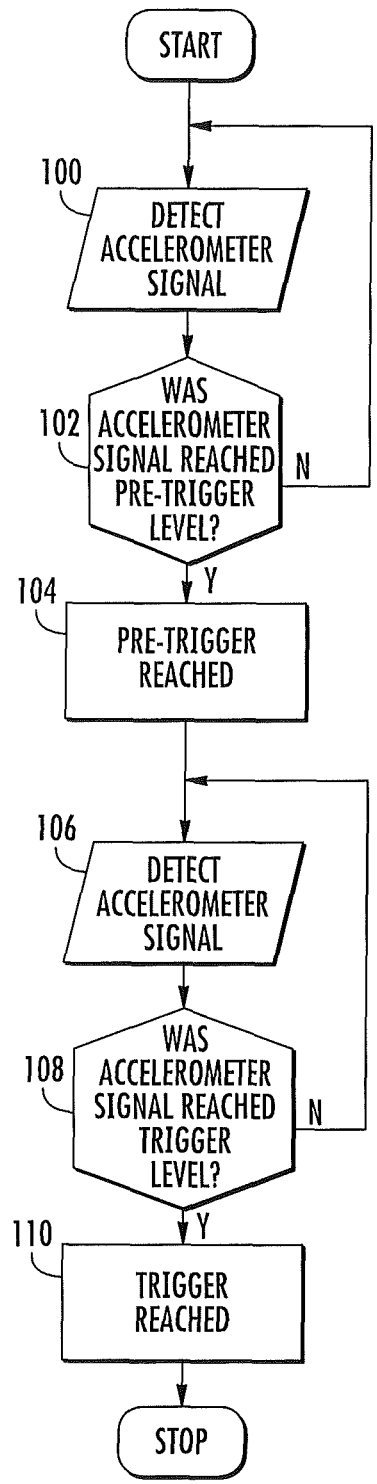
FIG. 5 is a flow chart illustrating operations of the roll of FIG. 1 according to embodiments of the invention.

A method for establishing a trigger point is shown in FIG. 5, with certain terms illustrated in FIG. 4. A data sample from the accelerometer is taken (block 100). This reading is compared to a predetermined "pre-trigger" threshold (decision 102). Assuming that it is not, another sample is taken (block 100) and the same comparison is made. At some point the value of the accelerometer data sample goes below the pre-trigger threshold, at which point the angular position of that sample is noted (block 104—see also FIG. 4). Following the flow chart of FIG. 5, additional accelerometer data samples are taken (block 106) as the data levels pass through the "pre-trigger box" and advance toward a pre-determined "trigger point" level. These samples are compared to the trigger point level (decision 108), with sampling continuing until the level of the signal passes above the trigger level. At this point a trigger has occurred (block 110—see also FIG. 4), and now can begin sampling of sensor data can begin, as the angular position of the roll is known.

The flowchart of FIG. 5 illustrates the architecture, functionality, and operations of embodiments of hardware and/or software according to various embodiments of the present invention. It will be understood that each block of the flowcharts, and combinations of blocks in the flowcharts, may be implemented by computer program instructions and/or hardware operations. In this regard, each block represents a module, segment, or portion of code, which comprises one or more executable instructions for implementing the specified logical function(s).

It should be noted that, in other implementations, the function(s) noted in the blocks may occur out of the order noted in FIG. 5. For example, two blocks shown in succession may, in fact, be executed substantially concurrently, or the blocks may sometimes be executed in the reverse order, depending on the functionality involved.

The computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowcharts.

The computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowcharts.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowcharts.

By using the accelerometer data to generate a trigger the position of the roll can be found almost exactly. The roll will trigger at the same point in the cycle repeatedly, and thus can be used to identify sensors strung around the roll. The use of both a low pre-trigger level and a higher trigger level can ensure that the accelerometer is at the bottom of the rotation for the example shown in FIG. 4. Because the method ensures that a pre-trigger level signal has been received prior to looking for a trigger level signal, a false positive due to signal noise can be avoided. The precise location of the trigger signal can be especially important in a sensor configuration reading multiple events per rotation, such as a roll having multiple nips resulting from multiple contacting rolls.

Notably, the technique described above may, in some embodiments, be performed such that the pre-trigger threshold is located near an extremum (i.e., a maximum or minimum) of the sinusoidal curve of the accelerometer function, and/or the trigger threshold may be near the midpoint of the sinusoidal curve. The data points near the midpoint tend to define a higher slope than those near an extremum; thus, locating the trigger threshold near the midpoint can reduce the chance that an incorrect, "noisy" signal could set off the trigger. In some embodiments, the trigger threshold is separated from the extremum by between about 70 and 110 degrees. In other embodiments, the trigger threshold is separated from the pre-trigger threshold by between about 90 and 130 degrees.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this That which is claimed is:

1. A method of determining the angular position of a roll, comprising:
   (a) detecting signals generated by an accelerometer attached to an end of a rotating roll, the roll including a plurality of sensors configured to detect an operational parameter;
   (b) determining whether a signal generated in step (a) has reached a pre-trigger threshold, and repeating step (a) if the signal has not reached the pre-trigger threshold;
   (c) if the signal is determined in step (b) to have reached the pre-trigger threshold, detecting a subsequent signal generated by the accelerometer;
   (d) determining whether the signal detected in step (c) has reached a trigger threshold, and repeating step (c) if the signal has not reached the trigger threshold;
   (e) if the signal has reached the trigger threshold, establishing the angular position of the roll based on the signal that has reached the trigger threshold;
   (f) gathering operational parameter data with the plurality of sensors;
   (g) correlating the operational parameter data gathered in step (f) with individual ones of the plurality of sensors based on the angular position of the roll established in step (e); and
   (h) adjusting a position of the roll based on the operational parameter data gathered in step (f) and correlated in step (g).

2. The method defined in claim 1, wherein the trigger threshold is higher than the pre-trigger threshold.

3. The method defined in claim 2, wherein the signals generated by the accelerometer define a sinusoidal curve.

4. The method defined in claim 3, wherein the pre-trigger threshold is located near an extremum of the sinusoidal curve, and wherein the trigger threshold is located near a midpoint of the sinusoidal curve.

5. The method defined in claim 4, wherein the trigger threshold is between about 70 and 110 degrees separated from the extremum of the sinusoidal curve.

6. The method defined in claim 4, wherein the trigger threshold is between about 90 and 130 degrees separated from the pre-trigger signal.

7. The method defined in claim 1, wherein the trigger threshold corresponds to an endmost sensor of the plurality of sensors.

8. The method defined in claim 1, wherein the plurality of sensors is arranged in a single helix along the length of the roll.

9. An industrial roll assembly, comprising:
   a cylindrical roll having a plurality of sensors mounted thereto and an accelerometer mounted to an end thereof, the plurality of sensors configured to detect an operational parameter of the roll; and
   a controller operatively associated with the accelerometer, the controller configured to provide adjustments to the position of the roll and to:
   (a) detect signals generated by the accelerometer;
   (b) determine whether a signal generated in (a) has reached a pre-trigger threshold, and repeating (a) if the signal has not reached the pre-trigger threshold;
   (c) if the signal is determined in (b) to have reached the pre-trigger threshold, detect a subsequent signal generated by the accelerometer;
   (d) determine whether the signal detected in (c) has reached a trigger threshold, and repeating (c) if the signal has not reached the trigger threshold; and
   (e) if the signal has reached the trigger threshold, establish the angular position of the roll based on the signal that has reached the trigger threshold;
   (f) gather operational parameter data with the plurality of sensors; and
   (g) correlate the operational parameter data with individual ones of the plurality of sensors based on the angular position of the roll established in step (e).

10. The assembly defined in claim 9, wherein the trigger threshold is higher than the pre-trigger threshold.

11. The assembly defined in claim 10, wherein the signals generated by the accelerometer define a sinusoidal curve.

12. The assembly defined in claim 11, wherein the pre-trigger threshold is located near an extremum of the sinusoidal curve, and wherein the trigger threshold is located near the midpoint of the sinusoidal curve.

13. The assembly defined in claim 12, wherein the trigger threshold is between about 70 and 110 degrees separated from the extremum of the sinusoidal curve.

14. The assembly defined in claim 12, wherein the trigger threshold is between about 90 and 130 degrees separated from the pre-trigger signal.

15. The assembly defined in claim 9, wherein the trigger threshold corresponds to an endmost sensor of the plurality of sensors.

16. The assembly defined in claim 15, wherein the plurality of sensors is arranged in a single helix along the length of the roll.

17. The method defined in claim 1, further comprising the step of adjusting a position of the roll based on the operational parameter data gathered in step (f) and correlated in step (g).

* * * * *